United States Patent [19]

McWaters

[11] 4,072,859
[45] Feb. 7, 1978

[54] WAND TURN-ON CONTROL

[75] Inventor: Lynn D. McWaters, Irving, Tex.

[73] Assignee: Recognition Equipment Incorporated, Dallas, Tex.

[21] Appl. No.: 729,531

[22] Filed: Oct. 4, 1976

[51] Int. Cl.² .................................................. H01J 39/12
[52] U.S. Cl. ..................................... 250/214 R; 250/568
[58] Field of Search ............... 250/214 R, 214 B, 221, 250/222, 568, 574; 235/61.11 E; 340/258 B, 237 S

[56] References Cited

U.S. PATENT DOCUMENTS

| | | | |
|---|---|---|---|
| 3,946,241 | 3/1976 | Malinowski | 250/214 R |
| 3,970,846 | 7/1976 | Schofield et al. | 340/258 B |
| 4,009,389 | 2/1977 | Lindholm | 250/221 |
| 4,029,957 | 6/1977 | Betz et al. | 250/221 |

Primary Examiner—David C. Nelms
Attorney, Agent, or Firm—John E. Vandigriff; Thomas W. DeMond

[57] ABSTRACT

Disclosed is a control circuit used to conserve power in a portable optical recognition system. When the system is not being used or between actual scans of the reading electronics, power is supplied only to those circuits required to control power to the system and to permit sequence reading of items. An infrared signal is emitted from the reading device and when a document or other item to be read is scanned the infrared signal is reflected back into the scan unit and is detected, thereby sensing that a document is being read and turning the system on.

11 Claims, 4 Drawing Figures

WAND TURN-ON CONTROL

FIELD OF THE INVENTION

This application relates to portable optical character recognition equipment and more particularly to a circuit for supplying power to the equipment only when the optical character reader is scanning a document or processing the information from a scanned document.

DESCRIPTION OF THE PRIOR ART

Systems for automatic reading alphanumeric data had been developed for various uses. Recently small hand-held units have been designed which allow manually scanning of alpha numeric characters by means of a hand-held sensing unit attached by flexible means to a processing and recognition unit. Such a system is disclosed in U.S. Pat. No. 3,947,817 entitled Hand Operated Optical Character Recognition Wand.

Generally, such a system is used in conjunction with point of sale terminals, credit verifiers and other devices which are connected to a normal source of power such that the unit may be left on continuously during a working period, and the conservation of power is not a major problem.

Such systems connected to normal sources of power are therefore not portable and may be used only at certain locations in conjunction with point of sale terminals or other fixed placed equipment. In some applications using hand OCR Wands it is desirable to be able to move from one location to another for such purposes as taking inventory of merchandise by reading labels on stored goods in order to determine the number of goods on hand.

SUMMARY OF INVENTION

In accordance with the present invention, a control circuit is provided to be used in conjunction with a portable optical character recognition system, so that the system is turned on only when a label or document is being scanned, and only during the time the scanned information is being processed. At all other times only the control circuit is on and the recognition system is turned off.

Low powered pulses are generated in the conrol circuit and continually emitted from the Wand. These pulses are reflected from a document whenever one is being scanned and is reflected back into a detector circuit in the Wand to activate the control circuit and thereby supplying power to the system. Safe guards are built into the system to determine when a received pulse is only an extraneous noise or other non-signal input which do not occur during the scanning of a document or label. The pulse signals are counted and if a defined number of pulses do not occur within a defined time interval, then the system is not turned on and the control circuit is reset prior to the receipt of actual signals which indicate a document is being scanned.

The control system described herein may be used in conjunction with the system defined in copending U.S. Pat. application Ser. No. 729,530, filed Oct. 4, 1976, and entitled Portable Optical Character Recognition System.

DESCRIPTION OF THE DRAWINGS

For a complete understanding of the present invention and the technical advance represented thereby, reference is now made to the following description, taken in conjunction with the accompanying drawings inwhich:

In FIG. 1 is illustrated one embodiment of a portable optical character recognition unit into which the control circuit of the present invention may be incorporated. Unit 10 is in the form of a portable case inwhich the recognition electronics and control circuit has been installed. The unit consists basically of a Wand or Optical Recognition Character Reader 7 which is interconnected with the electronics in the case by the cable 8. The Wand is used to read the printing on document 9. The control circuit is to conserve power for the portable unit and to supply power only when a piece of paper or label is in front of the Wand. When paper is placed in front of the Wand, a signal or pulse 11 travels from the Wand to the paper and is reflected back at 12. The presence of the paper is sensed and the illumination and power for the Optical Character Recognition Unit and the electronics is turned on. Thus when the Wand is not near reflective paper, the battery is not discharged by the high powered requirements of the Optical Character Recognition electronics. When the Wand is near the reflective paper the illumination and electronics are turned on for Optical Character Recogniton reading. In typical applications, this will increase the battery life by four to five times.

In addition to the Wand and the case, there is a keyboard 3 which may be used to manually input data into the system if the data is of such a nature that it cannot be read by the Wand. Switches 5 control the operating modes of the recognition unit. When data is read and verified, it is displayed on Display Unit 4 and recorded on the cassette recorder indicated at 2. There is provision for a charger input as indicated at 6, so that the unit may be charged in preparation for portable use.

Figure 2:
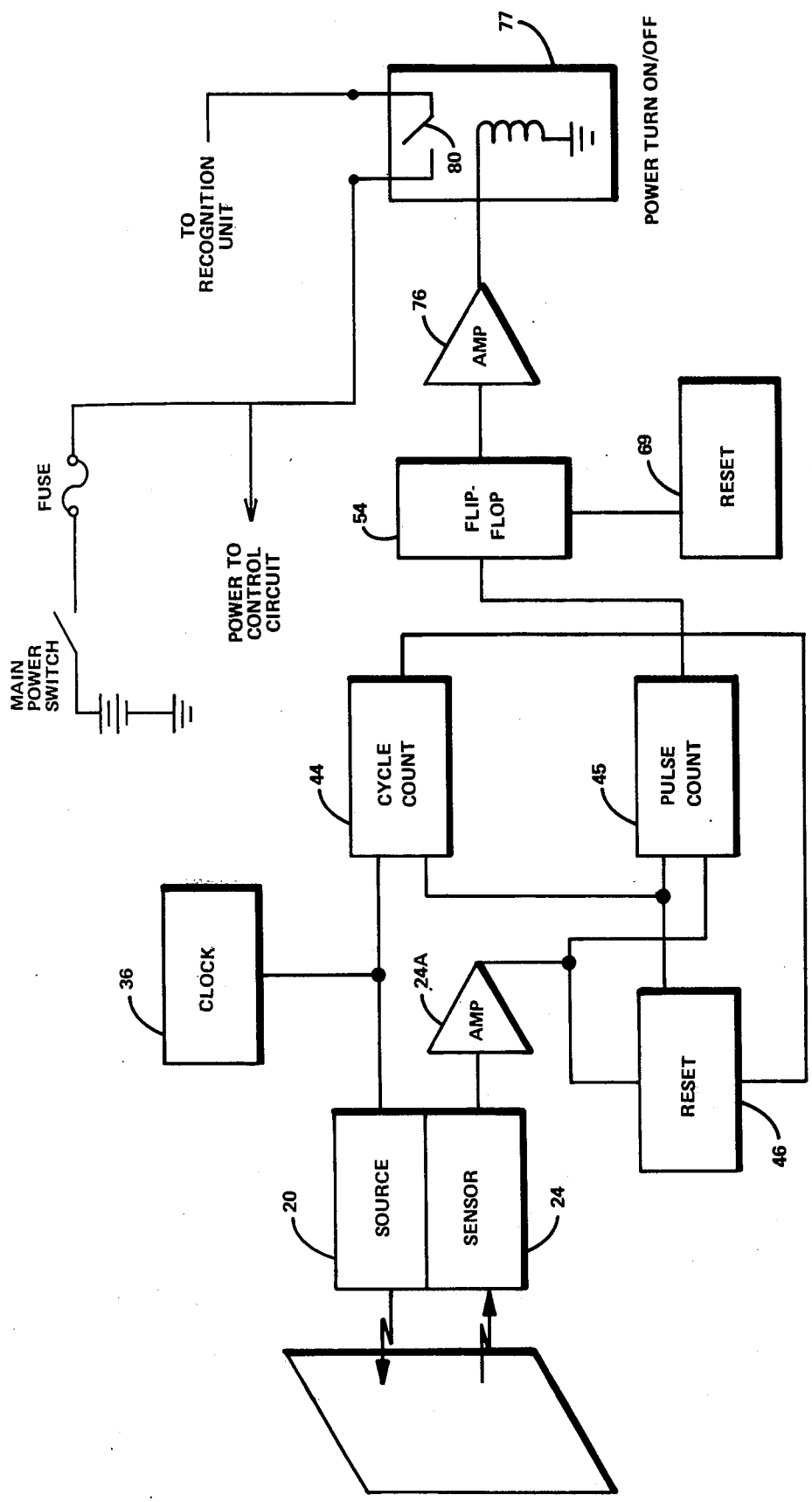
FIG. 2 is a block diagram illustrating the overall control circuit of the invention.

In FIG. 2 is illustrated a functional block diagram of the control circuit. The signal source and detector used with the system are made up from a radiation emitting diode and radiation detecting diode. These diodes operate in infrared frequency range such that when paper or another infrared reflecting substance is placed approximately 0.1 inch to 0.25 inch from the nose of the OCR Wand, the pulse source 20 emits energy which is reflected back into the sensor 24. The reflected energy is converted to an electrical signal by the sensor 24.

The detected signal is in amplified in amplifier 24A. This amplifier also includes a network to shape the received signals into a digital pulses for additional digital processing.

A clock 26 provides a low duty cycle, approximately one percent, pulse of 50 microsecond pulse width at 200 pulses per second. The pulsing of the source from the clock generates the energy which is transmitted to the document and reflected back to the sensor 24. By having a low duty cycle clock, reduced average power is supplied to the IR source 20. Providing such a pulse permits the sensor amplifier 24A to be AC coupled thereby minimizing the effects of ambient light.

If paper is present at the nose of the OCR Wand, a digital pulse is produced by the amplifier 24A whic is counted by pulse counter 45. If the pulse counter 45 underflows signaling that paper is present, flip-flop 54 changes state producing a voltage level that is amplified in amplifier 76 closing switch 80 of relay 77. With switch 80 closed, power is supplied to the recognition electronics.

Cycle counter 44 is used to prevent the system from being operated by a false signal, reducing the false alarm rate of the sensor. The cycle count of counter 44 is greater than that of pulse count counter 45. A pulse to the flip-flop 54 will not appear at the output of the pulse count counter 45 until six pulses from amplifier 24A have occured at the input of pulse counter 45. The system resets each eight pulses of the clock and in the interium if six pulses are not counted by the pulse count counter 45, then the system will be continually reset in the off condition until six out of eight pulses occur between the reset pulses from the cycle count counter. The reset circuit 46 is the circuit which is reset each eight counts by the cycle count counter.

Another reset circuit 69 is used in conjunction with the control circuit. Its function will be described hereinafter in reference to an overall description of the circuit in conjunction with the recognition electronics.

When a pulse from the pulse counter 45 goes to the flip flop 54, the flip flop output level changes. The output level is then amplified by amplifier 76 which in turn triggers the relay 77 turning the power on to the electronics. When flip-flop 54 is reset from reset circuit 69 the power to the Recognition Electronics is turned off, due to the completion of a read cycle of the recognition equipment.

Figure 3:
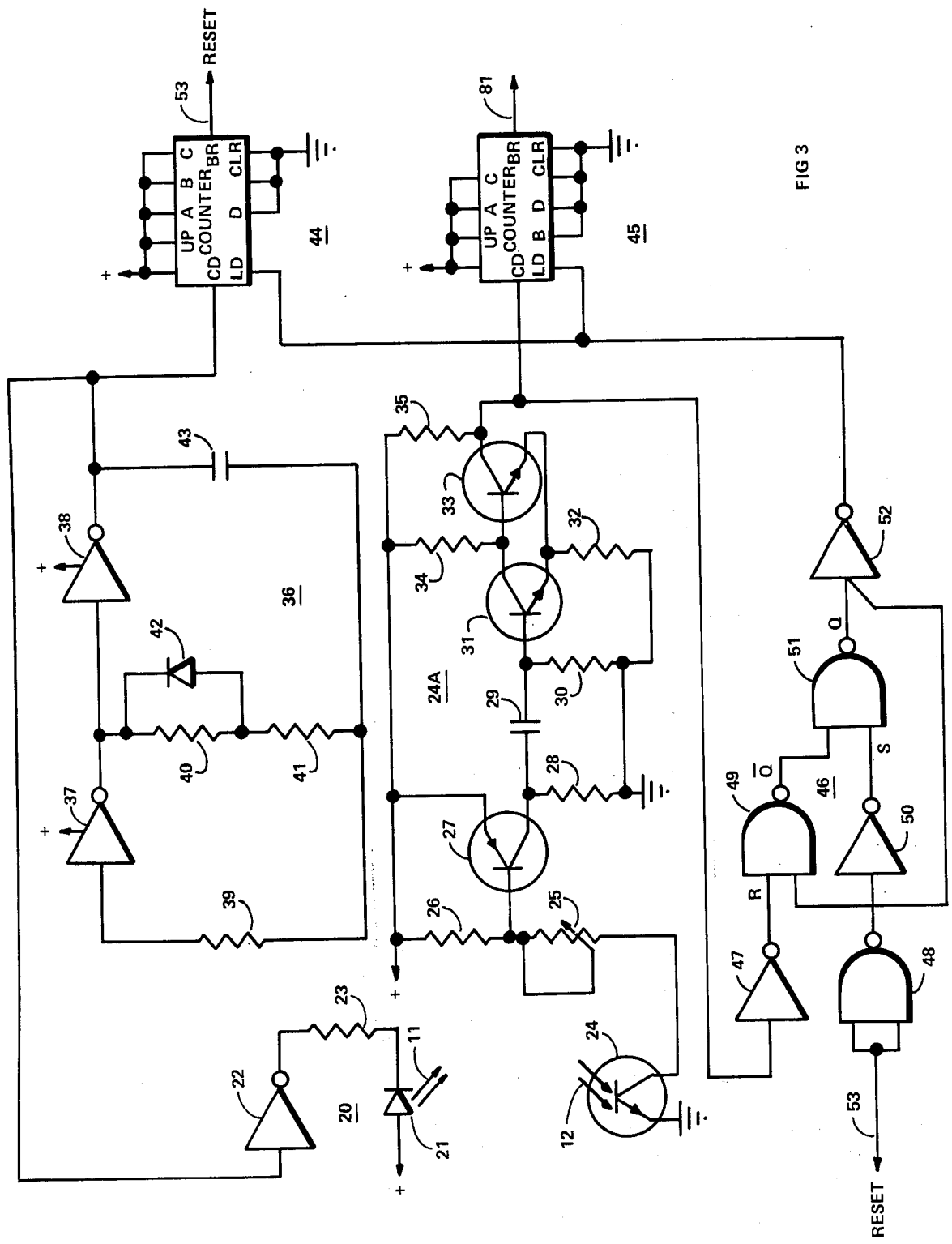
FIGS. 3 and 4 illustrate a detailed circuit diagram depicting the various parts of the control circuit.
Figure 4:
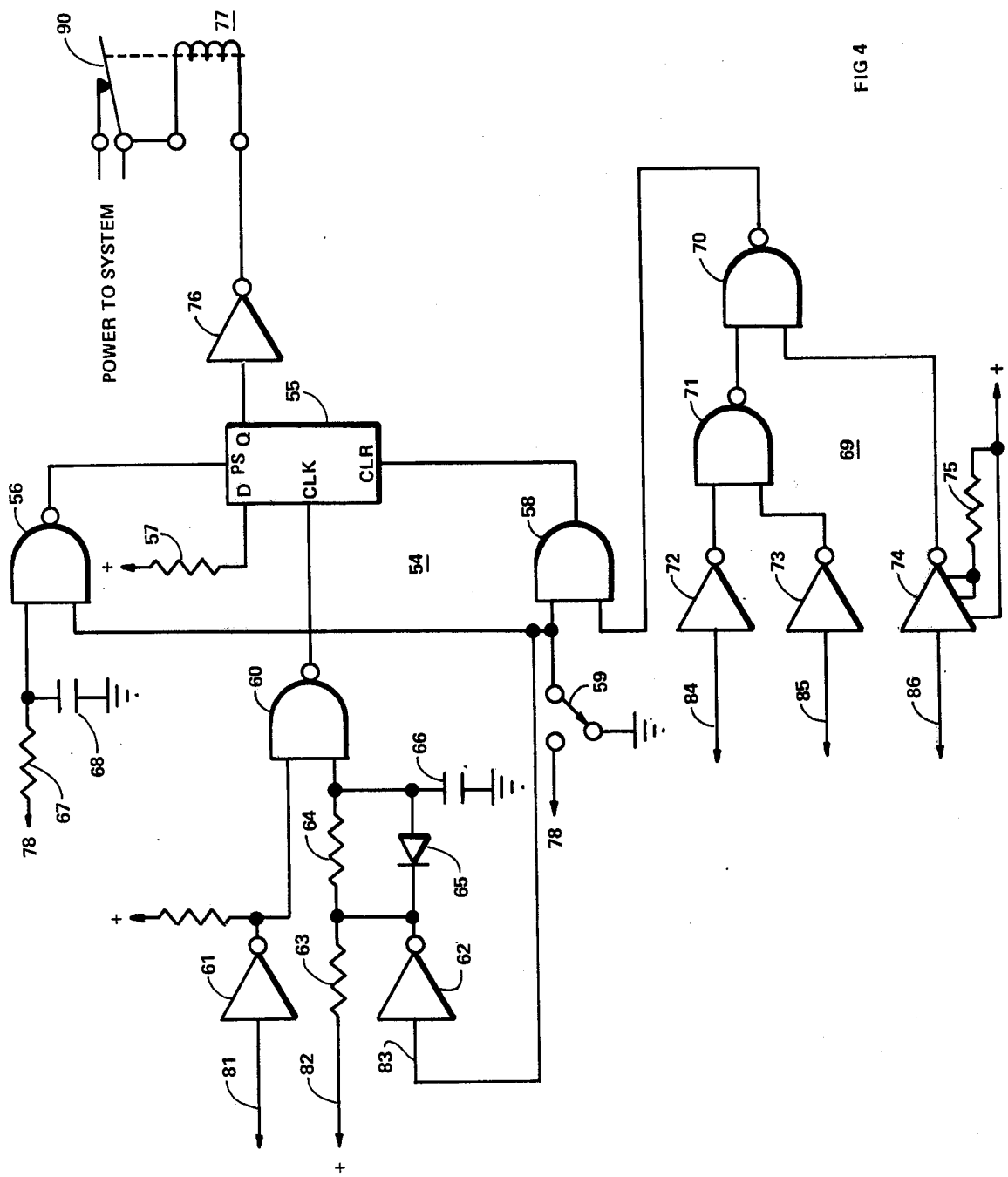

Looking at FIGS. 3 and 4, these figures illustrate a circuit diagram of one embodient of the control circuit. In FIG. 3 the clock is made up of two amplifiers 37 and 38 which are interconnected with bias resistors 39, 40, and 41 and a feed-back. The feed-back is provided through capacitor 43. The RC coupling between the amplifiers provide a duty cycle of approximately one percent. A fifty microsecond wide pulse is generated at a rate of 200 pulses per second. The output of the clock is fed to the counter 44 and to the transmitter 20.

Figure 1:
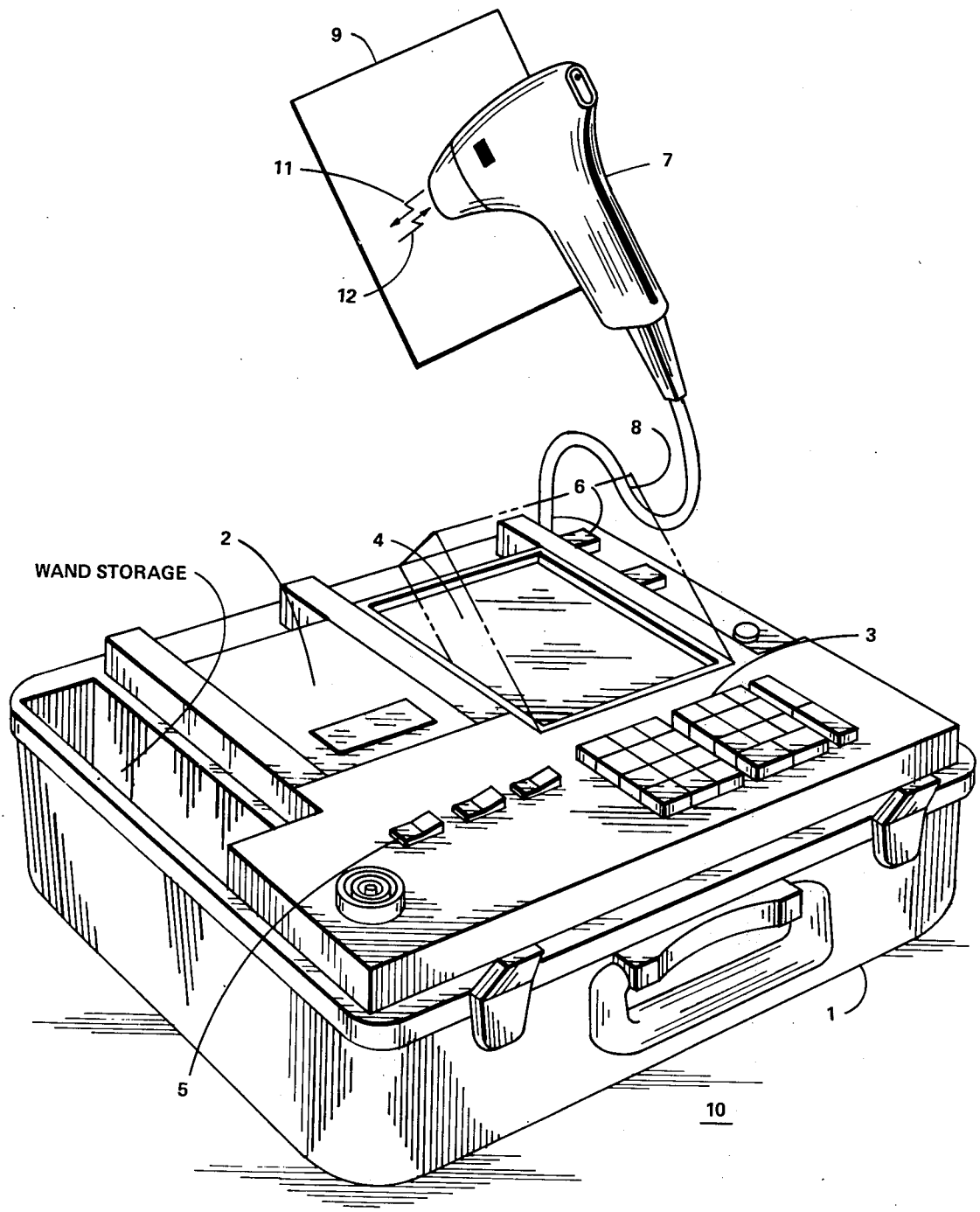
FIG. 1 is a perspective view of an optical character recognition system used in conjuction with the present invention.

Transmitter 20 includes inverting amplifier 22, resistor 23 and a infrared emitting diode 21. Each time a pulse is fed from the clock to the transmitting source infrared radiation 11 is emitted which impinges upon any document placed in the vicinity of the end of the Wand 7 (illustrated in FIG. 1). When there is an infrared reflecting surface adjacent to the Wand, the reflected infrared radiation 12 is reflected to the sensor 25 which is a infrared sensing photo detector.

The sensed infrared pulse received by the detector 24 is coupled to an amplifier 27. Bias resistors 25 and 26 are provided for the transister 24, and resistor 25 is variable so that the gain of the circuit may be varied. The received pulses are amplified by transistor 27 and AC coupled through the network made up of resistors 28 and 30 and capacitor 29 to another amplifier circuit made up transistors 31 and 33 and biasing resistors 32, 34 and 35. The amplified pulse is then coupled to the counter 45. Counter 45 as well as counter 44 may be, for example, synchronous up/down counters of the type manufactured by Texas Instruments Incorporated and which carry the device designation SN47193.

The counters 44 and 45 are programmable in that the output of each counter may be preset to a particular level by entering the desired data at the inputs while the load input is low. In the present circuit, the counter 44 has a preset binary coded decimal input of 7 set at the inputs A, B, C, and D, for example, the input D is the most significant bit, so that the input is a 0111 which represents a binary coded decimal 7.

The counter 45 has preset at its inputs A, B, C and D a binary coded decimal 5, or 0101. The load input designated LD of counter 44 and 45 are connected together and connected to the output of the reset circuit 46. The inputs are preset by either connecting the input terminals A, B, C and D to positive potential or to ground, whereas the positive potential represents a binary one and ground represents a binary zero.

The effective count input to each of counters 44 and 45 is the count down input designated CD in FIG. 3. The count input to counter 44 is from the clock 36 and the input to counter 45 is from the amplifier circuit 24A. The operation of each of these circuits is as follows.

As the pulses are received by the sensor 24 and amplified by the amplifier 24A they are coupled into the CD input of counter 45. Counter 45 is preset to a count of five. Therefore, when the pulses from the amplifier 24A are counted by counter 45, the count will start at 5 and countdown to borrow. If the counter is not reset during this period, after 6 counts a pulse appears on line 81 from counter 45. Line 81 is the borrow output of the counter indicated by the BR. Six pulses received by the Sensor and counted by the counter will then activate a relay which turns on the power to the Wand recognition electronic.

Counter 44 is continuously receiving pulses from the clock. Since a binary 7 is preset into the counter, it will count down to borrow each time there are 8 counts and a pulse will appear at the borrow terminal BR and on line 53. Line 53 is connected to the reset latch 46. The reset latch 46 is made up of an input NAND gate 48, inverting amplifiers 47, 50 and 52 and an RS latch made up of NAND gates 49 and 51. The operation of an RS NAND latch is well known and the description of its design and operation may be found in the publication *Designing With TTL Circuits,* by Robert L. Morris and John R. Miller and published by McGraw-Hill Company. The RS NAND Latch is illustrated on page 163 of this publication. The latch has two basic states. When a binary one appears at the S input of NAND gate 51, a binary one will appear at the Q output. When a binary one appears at the R input of NAND gate 49, a binary zero will appear at the Q output of NAND gate 51. Therefore the binary state of the Q output of NAND gate 51 may be alternatively changed between a binary one and a binary zero by pulsing either the R input of the NAND gate 49 or the S input of NAND gate 51.

When counter 44 reaches a count of eight, a reset pulse is fed to the reset latch causing the latch 46 to change state, driving the inputs LD of the counters low, programming in the present numbers, a seven in counter 44 and a five in counter 45. If six sucessive impulses are received by counter 45, indicating that a document is being scanned, then the Wand illumination and electronics are turned on. However, if the counter 44 counts eight pulses during a period in which less than six pulses are received by counter 45, the reset latch resets both of the counters to their programmed counting state. The counters will continue to be programmed as long as six sucessive pulses are not received by counter 45 prior to counter 44 receiving eight consecutive clock pulses.

FIG. 4, illustrates flip flop 54 and remaining turn on/turn off circuits. When six sucessive pulses are received by counter 45, then at that time a negative going pulse or binary zero will appear on line 81. The line 81 goes to an inverting amplifier 61 which is coupled to a NAND gate 60. Also coupled to NAND gate 60 are inputs on two other lines, lines 82 and line 83. Line 82 is a connection to the battery which supplys voltage to the inverting amplifier 62, bias resistor 63 and 64, diode 65 and capacitor 66. This circuitry disables gate 60 on initial power up until capacitor 66 is charged. The input to inverting amplifier 62 is line 83 which is connected to the clear input of flip flop 55. Line 83 is connected to switch 59 which when connected to the ground position overides the sensor circuit and presets flip-flop 55.

When a signal from counter 45 as well as a signal from the clear line 83 is applied to the input of NAND gate 60, a change in state from binary one to binary zero will appear at the output NAND gate 60, which will in turn cause a change of state of flip flop 55. This change of state changes the state at the Q output of flip flop 55 which is amplified by the amplifier 76, and actuates relay 77, which in turn closes contact 90, thereby supplying power to the recognition electronics.

Returning now to the clear input of flip flop 55, there is connected thereto a AND gate 58. The input to AND gate 58 is connected to a switch 59. Switch 59 is used to override the control circuit so that the Wand illumination and the Wand recognition electronics will be on at all times. When the switch is in the grounded position, the equipment will be on at all times. When it is in the ungrounded position, the control circuit will be operative to turn the equipment on and off, depending upon whether a document is being scanned.

A second input to NAND gate 58 is connected to a reset circuit 69. This circuit is connected to the Wand recognition unit and prevents the Wand recognition electronics from being turned off after data has been scanned and the recognition process is in operation. Input line 86 has an input thereon which is indicative of the state of operation of the recognition unit. When it is in operation, a signal is supplied thereto to alert the control circuit that the electronics is being utilized so that the system will not be turned off. Line 85 is used to alert the control system that the illumination lamps in the Wand are on and not to turn the system off.

An input on line 84 is used to indicate when the equipment is first turned on. The system is reset to an initial state to indicate that the power has not been on and to permit the system to come up to full operating power and readiness prior to permitting a signal count to start which would turn the equipment off. In operation it is necessary that there be an indication on each of the lines 84, 85 and 86 before the system can be reset for a subsequent read cycle.

NAND gate 56 has one of its inputs connected to the input of NAND gate 58. The other input of NAND gate 58 is connected to the ungrounded terminal switch 59. This circuitry is used in conjunction with the switch to lock out the control circuit from changing the state of flip flop 55 when it is desired that the equipment remain in an on condition. The NAND gate 56 is connected to the preset input of flip flop 55. The preset input is designated PS.

Although the control circuit described herein has been shown in one specific embodiment various modifications and changes can be made without departing from the spirit and scope of the invention which is defined by the claims.

What is claimed:

1. A control circuit for conserving power in a battery powered system comprising: a sensing means for determining when the system is placed into use and for generating pulses indicative of said use, a clock circuit for generating clock pulses, a counting circuit for counting pulses generated by said sensing means and clock and for generating a signal when said counting circuit counts to a predetermined state, and a power control circuit responsive to said generated signal for controlling power to said system when said system is placed into use.

2. The control circuit according to claim 1, wherein said sensing means include a device for radiating infrared signals and a detector for receiving reflections of said infrared signals.

3. The control circuit according to claim 1, wherein said counting circuit includes two up/down counters operating in the count down mode and a reset circuit.

4. The control circuit according to claim 3 wherein said reset circuit is a latch circuit periodically triggered by said counters.

5. The control circuit according to claim 3 wherein one of the counters is programmed to count down from seven and the other to count down from five.

6. The control circuit according to claim 1 wherein the power control circuit includes a flip flop and a relay circuit, the flip flop upon receiving a pulse from said counting circuit triggers said relay circuit supply power to said system.

7. A control circuit for conserving power in a battery powered system comprising: a source of pulsed radiated energy, a detector for receiving reflected pulses of said radiated energy, a clock circuit for producing pulses, a first counting circuit for receiving and counting clock pulses, a second counting circuit for receiving and counting said received reflected pulses, said first and second counting circuits each programmed to count down from a different predetermined number, a reset circuit for resetting both said counters when said first counter counts down before said second counter counts down, and a power control circuit triggered by said second count circuit when said second counting circuit counts down before said first counting circuit.

8. The control circuit according to claim 7 wherein the source of pulse radiated energy and detector are in an optical character recognition Wand system and reflected pulses are received by said detector when said Wand is placed adjacent a document or label from which printed data is to be read by said Wand.

9. The control circuit according to claim 7 wherein said reset circuit resets said first and second counting circuits when said first counting circuit receives eight clock pulses before said second counting circuits receives six reflected pulses.

10. The control circuit according to claim 8, including a second reset circuit which maintains power to said Wand system when there is no document or label adjacent said Wand but the Wand system is still processing information previously read by said Wand.

11. An optical character recogniton wand in combination with a power control circuit comprising; an optical character recognition wand for reading information, a transmitting device located in said wand for sending signals, a receiving device in said wand for receiving reflections of said signals when the wand is placed adjacent an item from which information is to be read, and a control circuit connected to said receiving device for supplying power to said wand when the wand is placed adjacent an item from which information is to be read.

* * * * *